United States Patent [19]

Dan et al.

[11] Patent Number: 5,768,520

[45] Date of Patent: Jun. 16, 1998

[54] METHOD FOR DETERMINING LOAD CAPACITY BY GROUPING PHYSICAL COMPONENTS INTO LOGICAL COMPONENTS WHOSE LOADS REPRESENT FIXED PROPORTIONAL LOADS OF PHYSICAL COMPONENTS

[75] Inventors: Asit Dan, West Harrison; Martin G. Kienzle, Somers; Dinkar Sitaram, Yorktown Heights; William H. Tetzlaff, Mount Kisco, all of N.Y.

[73] Assignee: International Business Machines Corporation, Armonk, N.Y.

[21] Appl. No.: 593,597

[22] Filed: Jan. 29, 1996

[51] Int. Cl.$^6$ .................................. G06F 15/16
[52] U.S. Cl. .................. 395/200.53; 395/200.56; 395/200.54; 395/200.65; 370/254
[58] Field of Search .............. 395/200.49, 200.53, 395/200.65, 200.69, 200.54, 200.56; 379/14; 370/231, 254

[56] References Cited

U.S. PATENT DOCUMENTS

| | | | |
|---|---|---|---|
| 5,410,586 | 4/1995 | Davies | 379/14 |
| 5,570,346 | 10/1996 | Shur | 370/231 |
| 5,586,264 | 12/1996 | Belknap et al. | 395/200.49 |

OTHER PUBLICATIONS

Hard–Kornacki et al., "Optimization Model for the Delivery of Interactive Multimedia Documents", GLOBECOM'91, pp. 669–673, 1991.

*Primary Examiner*—Thomas C. Lee
*Assistant Examiner*—Ki S. Kim
*Attorney, Agent, or Firm*—Richard M. Ludwin; Kevin M. Jordan

[57] ABSTRACT

A system and method are provided for determining load capacity of a system. Physical components of the system and their interconnection are identified. The physical components are converted into logical components such that at least one logical component is created by grouping a plurality of the physical components and such that a load on the logical component will result in an approximately fixed proportional load on the plurality of physical components. Links between the logical components and a proportion of the load placed on each link between a source and destination pair are determined. A model of the logical components and interconnection of the logical components in is then stored in an electronically accessible data structure formed in a memory. A system and method for determining a path for routing data between a source and a destination pair in a system are also provided. An interconnection model of logical system components and logical links is provided wherein the model reflects the saturation capacity of each of the logical system components and each of the logical links. The bandwidth required for providing the data is determined. Then, by reference to the model, a path between the source and destination pair is selected that would not saturate any of the logical system components and logical links when providing the data. System capacity is then reserved by altering the model to reflect the load on the system components that would be required by providing the data from the source to the destination by way of the selected path.

7 Claims, 18 Drawing Sheets

LOGICAL LINK TABLE (LLT) 200

| NodeID 210 | LINKS 218 |
|---|---|
|  |  |
|  |  |

LinkEntry 220

| NextLnk 234 | LinkDevId 230 |
|---|---|

PHYSICAL DEVICE FILE (PDF) 306

| PhysDevId 310 | PhysDevType 314 |
|---|---|
|  |  |
|  |  |
|  |  |

PHYSICAL CONFIGURATION FILE (PCF) 316

| DevId1 320 | DevId2 324 |
|---|---|
|  |  |
|  |  |
|  |  |

LOGICAL CONFIGURATION FILE (LCF) 326

| LDevId 330 | LogDevType 332 | SCompId 334 |
|---|---|---|
|  |  |  |
|  |  |  |
|  |  |  |

FRACTIONAL PATH TABLE (FPT) 510

| WEIGHT 512 | MaxBW 513 | PATH 514 |
|---|---|---|
|  |  |  |
|  |  |  |
|  |  |  |
|  |  |  |
|  |  |  |
|  |  |  |
|  |  |  |

METHOD FOR DETERMINING LOAD CAPACITY BY GROUPING PHYSICAL COMPONENTS INTO LOGICAL COMPONENTS WHOSE LOADS REPRESENT FIXED PROPORTIONAL LOADS OF PHYSICAL COMPONENTS

I. BACKGROUND OF THE INVENTION a. Field of the Invention

The present invention relates to a video on demand system of the type wherein multiple clients are serviced by video streams delivered from a video server.

b. Related Art

A generalized video server environment includes multiple devices (e.g., CPU, disk, SCSI adapter, switch, etc.) connected in complex ways. Each device has a maximum data rate capacity that it can deliver. Unlike many other applications, VOD applications have hard real-time response requirements to ensure a continuous delivery of data to the clients. Hence video servers have to implement reservation of sufficient resources at the server to guarantee uninterrupted delivery of a video stream. This implies a priori knowledge of the server capacity. An empirical estimation process, referred to as "calibration" can be used to estimate this capacity, where new concurrent video streams are created until the system runs out of capacity.

In a simplistic approach, the server capacity is represented as a single number. However, this can result in extreme under-utilization when the video data associated with different video objects span across different sets of disks. Hence, while accessing a video object, the bottleneck may arise in any of the devices (e.g., CPU, disk, etc.). Simultaneous access of different devices and/or video objects may complicate the situation further since the location of the bottleneck will depend on the workload combination. For example, if multiple disks are connected to a single adapter the bottleneck may arise in any one of the disks or in the adapter.

An alternative approach would be to enumerate all possible combinations of workload that can be supported. In a real environment, this can be impractical because of the time required to measure all possible combinations as well as the space required to remember all possibilities. In addition, with such a black-box approach, any reconfiguration of the system due to failure, addition/deletion of components, as well as changes in striping of video objects, may require re-calibration of the server.

II. SUMMARY OF THE INVENTION

In light of the foregoing, a first aspect of the present invention includes a path based system and method for identifying bottleneck components of a video server and estimating their capacities. A second aspect of the present invention includes a system and method for determining a path for routing data between a source and a destination pair in a system based on a capacity model representing interconnected logical nodes.

In accordance with a first aspect, physical components of the system and their interconnection are identified. The physical components are converted into logical components such that at least one logical component is created by grouping a plurality of the physical components and such that a load on the logical component will result in an approximately fixed proportional load on the plurality of physical components. Links between the logical components and a proportion of the load placed on each link between a source and destination pair are determined. A model of the logical components and interconnection of the logical components in is then stored in an electronically accessible data structure formed in a memory.

In accordance with the second aspect, an interconnection model of logical system components and logical links is provided wherein the model reflects the saturation capacity of each of the logical system components and each of the logical links. The bandwidth required for providing the data is determined. Then, by reference to the model, a path between the source and destination pair is selected that would not saturate any of the logical system components and logical links when providing the data. System capacity is then reserved by updating the model to reflect the load on the system components that would be required by providing the data from the source to the destination by way of the selected path.

III. BRIEF DESCRIPTION OF THE DRAWINGS

IV. DETAILED DESCRIPTION OF A PREFERRED EMBODIMENT

Figure 6:
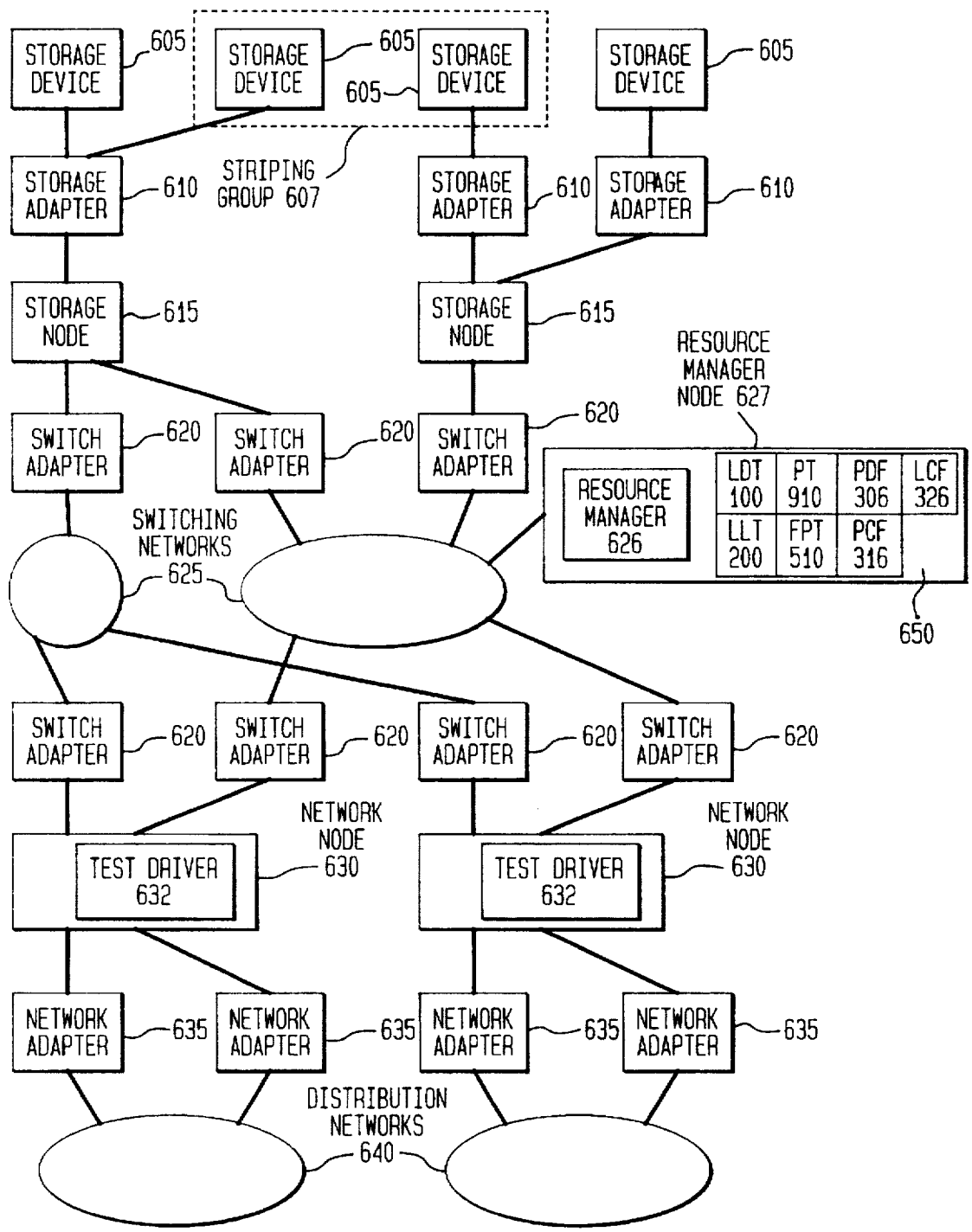
FIG. 6 is a diagram of a Video-On-Demand (VOD) server system.

FIG. 6 is a block diagram of a typical video-on-demand server system. The system includes storage devices 605 for the storage of video (typically disks). Some or all of the storage devices 605 may be striped together into striping groups 607. If a storage device 605 is not part of any striping group, it is considered to be in its own striping group. The storage devices 605 are connected via storage adapters 610 to storage (processor) nodes 615. The storage nodes 615 are responsible for the retrieval of video data from the storage devices 605 and can be embodied, for example, using workstations such as IBM RS/6000 systems. The storage adapters 610 may be connected to one or multiple storage devices 605. The storage nodes 615 may also be connected to one or multiple storage adapters 610.

The storage nodes 615 are connected via switch adapters 620 and switching networks 625 to network nodes 630. The storage nodes 615 may be connected to one or more switch adapters 620 and there may be one or more switching networks 625. The network nodes 630 are responsible for receiving the video data from the storage nodes 615 and transmitting it to the clients (not shown) via network adapters 635 and distribution networks 640. Note that though for convenience, the storage nodes 615 and network nodes 630 are shown as physically distinct processing nodes, both may be executed on the same processing node (e.g. both embodied on the same workstation). Also, not all the storage nodes 615 may be accessible from all the network nodes 630.

The network nodes 630 contain test drivers 632. The test drivers 632 are embodied as program code instantiated in the memory of the network nodes 630. The purpose of the test drivers 632 are to exercise the system under the direction of the resource manager. The resource manager uses the data it gathers from the exercising of the system to estimate the bandwidth of the various system components. Under the control of the resource manager 626, the test drivers 632 read video data at varying rates from any accessible striping group. Each accessed video file is read sequentially so that the relative load created on each storage device of a striping group will be similar to the relative load on that device expected during normal operation of the system.

The system also contains a resource manager node 626 containing a resource manager 627. Similar to the network nodes and the storage nodes, the resource manager node 630 is shown as physically distinct processing node, but may be embodied on the same processing node as a network node or a storage node. As described below, the resource manager 626 (embodied as program code instantiated in the memory of the resource manager node) is responsible for estimating the bandwidth of all the components on the server, performing admission control and bandwidth reservation needed for playing a video stream and for adjusting the bandwidth of the components upon failure of a component.

The resource manager 626 maintains a number of data structures which are instantiated in memory 650 of the resource manager node 627. These include a Logical Device Table (LDT) 100, a Logical Link Table (LLT) 200, a Physical Device File (PDF) 306, a Physical Configuration File (PCF) 316, a Logical Configuration File (LCF) 326, a Fractional Path Table (FPT) 510 and a Path Table (PT) 910. Some or all of the above data structures can be maintained in the node's permanent storage (e.g. a disk drive). Preferably, a copy of the LDT, LLT and PT is maintained in the node's main memory.

Figure 1:
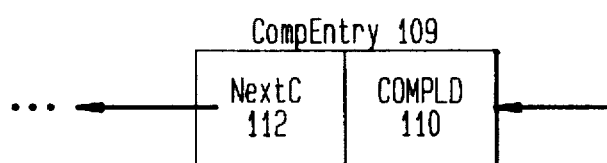
FIG. 1 is a diagram of the Logical Device Table.

FIG. 1 is a diagram of the Logical Device Table (LDT) 100 used to store information about each logical device in the system. The entry for each device includes the device identifier DevId 102, the device type DevType 104, a flag (TLFlag) 105 that is 1 if this device is an essential component and 0 otherwise, fields BW 106 and Alloc 107 that are the maximum estimated and allocated bandwidth, respectively, of the device, a field Status 113 to indicate the status of the device (FAILED or READY), and a field SubComps 108 that points to a list of the subcomponents, if any, of the device.

The entry for each subcomponent, CompEntry 109, contains the identifier of the subcomponent CompId 110 and a field NextC 112 that points to the next subcomponent in the list. The DevType 104 may be NETW to indicate that the device is a network interface, STRG to indicate that the device is a striping group, as well as other valuse to indicate other hardware component types.

Figures 2, 3:
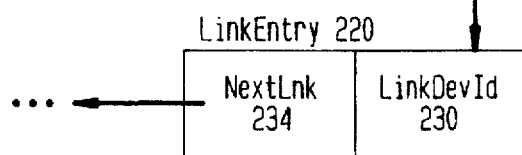
FIG. 2 is a diagram of the Logical Link Table.
FIG. 3 is a diagram of the configuration files.

FIG. 2 is a diagram of the Logical Link Table (LLT) 200 used to store the connections between the various devices in the video server. The entry for each device consists of the device identifier NodeId 210 and Links 218, a pointer to a list of the other devices this device is connected to. The entry for each connected device consists of a LinkEntry 220 containing the identifier of the connected device LinkDevId 230, and NextLnk 234, a pointer to the next LinkEntry.

FIG. 3 shows the configuration files used by the resource manager. The Physical Device File (PDF) 306 is a file containing a list of the hardware devices that make up the video server (e.g. disk, processor, adapter). Each record consists of the device identifier PhysDevId 310 and the type of the device PhysDevType 314 which takes on the same values as the DevType 104 field. The Physical Configuration File (PCF) 316 is a file that lists the connection between the various devices in the video server. The PCF 316 contains a record for each connection consisting of the identifiers of the devices which are connected DevId1 320 and DevId2 324. The Logical Configuration File (LCF) 326 is a list of the logical devices in the system formed through striping of data on muliple physical devices (e.g. a disk striping group). There is a record for each subcomponent consisting of LDevId 330, the logical device to which the subcomponent belongs, LogDevType 332 the type of Ldevid, and SCompId 334, the identifier of the subcomponent.

Figure 5:
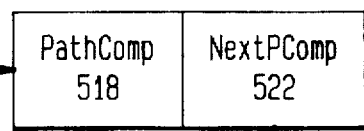
FIG. 5 is a diagram of the Fractional Path Table.

FIG. 5 shows the Fractional Path Table (FPT) 510 used for storing the fractional flow through each data path between a pair of source and destination nodes in the video server. There is an entry for each fractional flow path consisting of the Weight 512 and MaxBW 513 fields that are used during estimation of the maximum capacity of each device. Additionally there is a path component list Path 514. Each entry in the list contains the identifier PathComp 518 of the component on the path and NextPComp 522 a pointer to the next component on the path.

Figure 9:
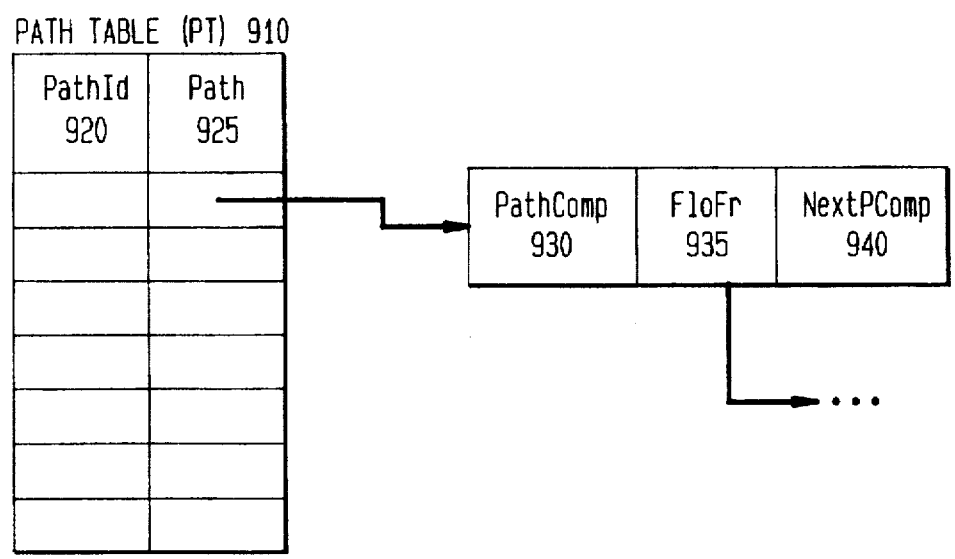
FIG. 9 is a diagram of the Path Table.

FIG. 9 shows the Path Table (PT) 910 used for storing the total flow through each node between a pair of source and destination nodes in the video server. There is an entry for each path including of the PathID 920 (composed of the source and desitination pair), and a Path field 925 (which is a pointer to a linked list 927 of nodes on the path. Each entry in the list contains the identifier PathComp 930 of the component on the path, the fraction of the total flow (FloFr) 935 through the node and NextPComp 940 a pointer to the next component on the path.

Figure 4A:
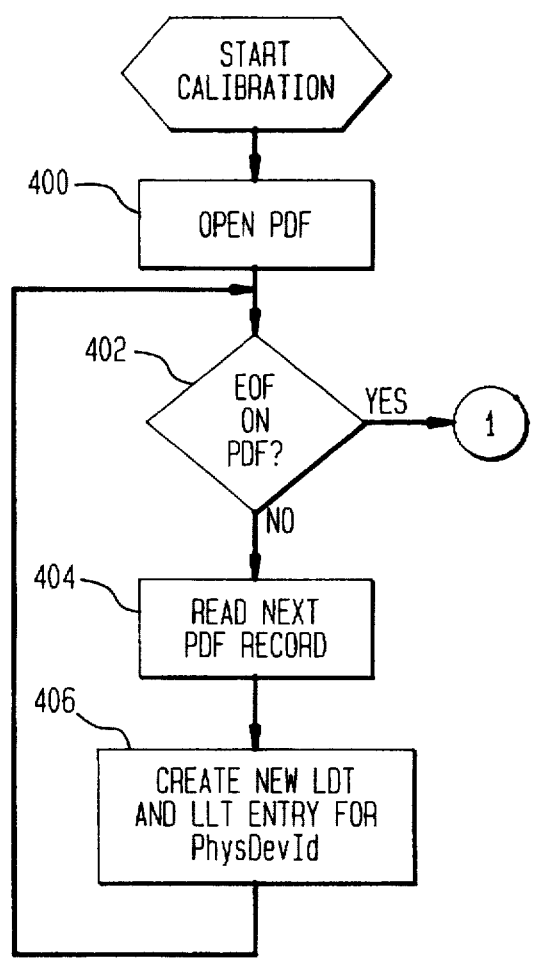
FIGS. 4A–4J show the capacity estimation process.

FIG. 4A shows the start of the calibration procedure and the initialization of the LDT 100. The resource manager 626 opens the PDF 306 in step 400. In step 402 it checks to see if it has reached end-of-file on the PDF 406. If it has, it proceeds to step 410. If not, it reads a record from the PDF 306 in step 404. In step 406, it creates new entries in the LDT 100 and LLT 200. The DevId 102 and NodeId 210 are set to the PhysDevId 310 and the DevType 104 is set to the PhysDevType 314. The TLFlag 105 is set to 1, the BW 106 to 0 and the SubComps 108 and Links 218 to Null. The resource manager 626 then re-executes step 402.

Figure 4B:
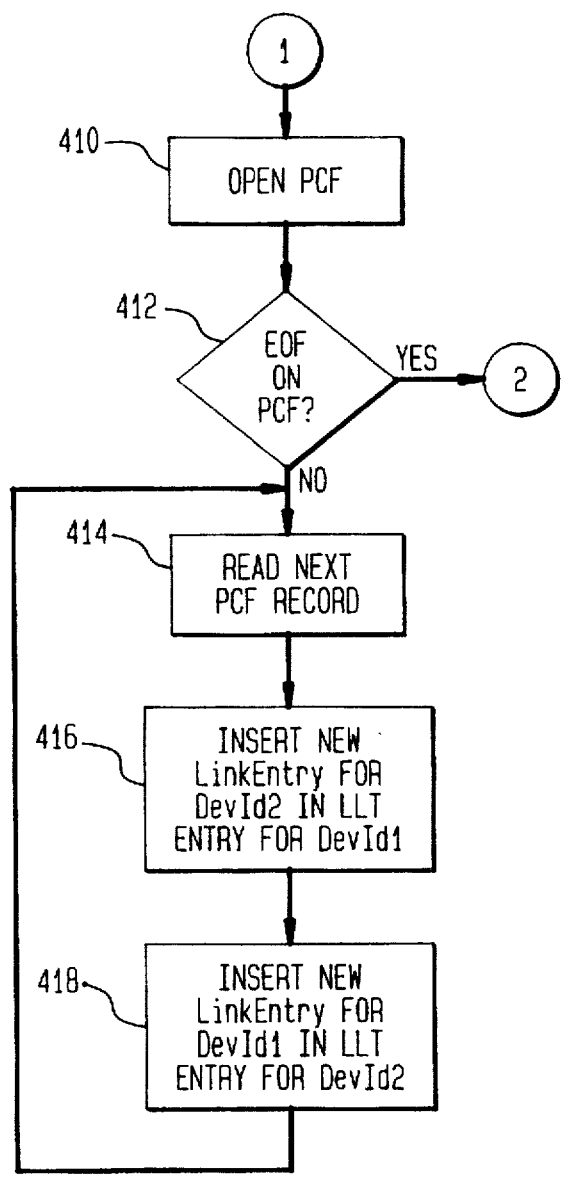

FIG. 4B shows the initialization of the LLT 200. The resource manager opens the PCF 316 in step 410. In step 412, the resource manager checks if it has reached end-of-file on the PCF 316. If it has, it proceeds to step 420. Otherwise, it reads the next record from the PCF 316 in step 414. In step 416, it locates the entry in the LLT 200 for the device DevId1 320 and inserts a LinkEntry 220 in the connection list pointed to by Links 218 with the LinkDevId 230 equal to DevId2. Similarly, in step 418, it locates the entry in the LLT 200 for the device DevId2 324 and inserts a LinkEntry 220 in the connection list with the LinkDevId 230 equal to DevId1

Figure 4C:
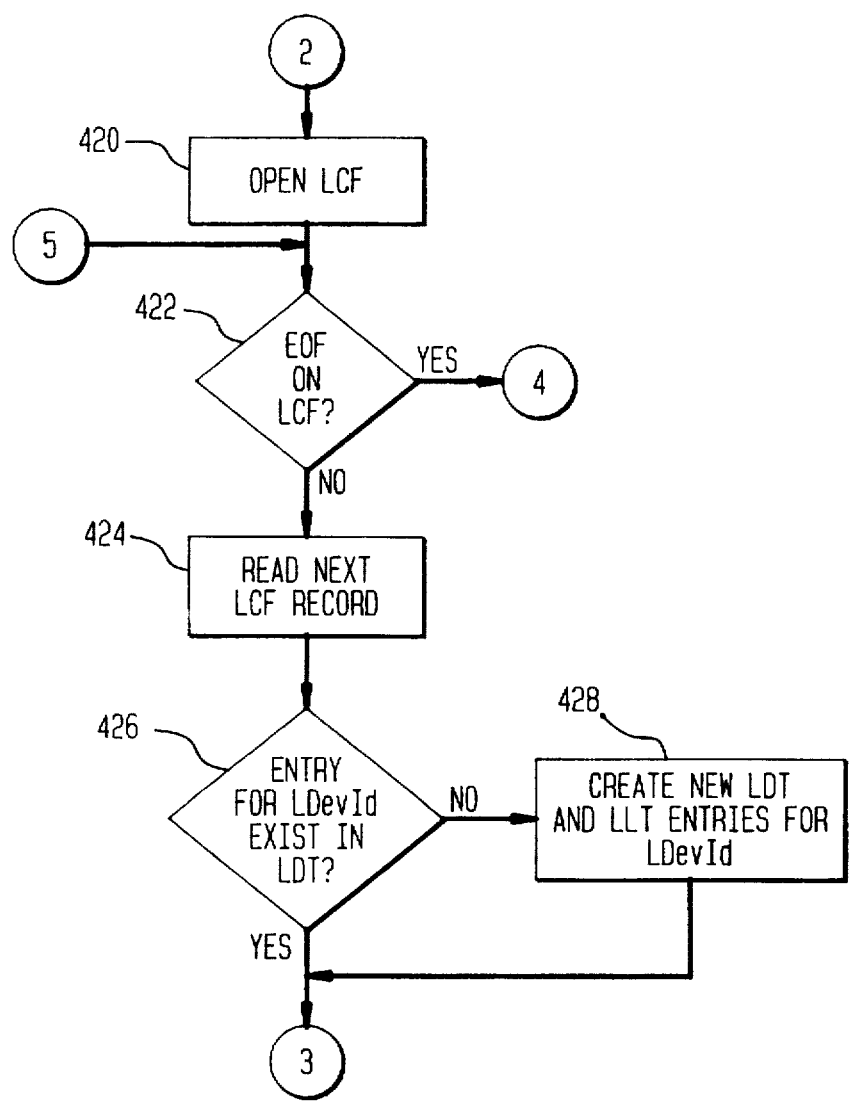
Figure 4D:
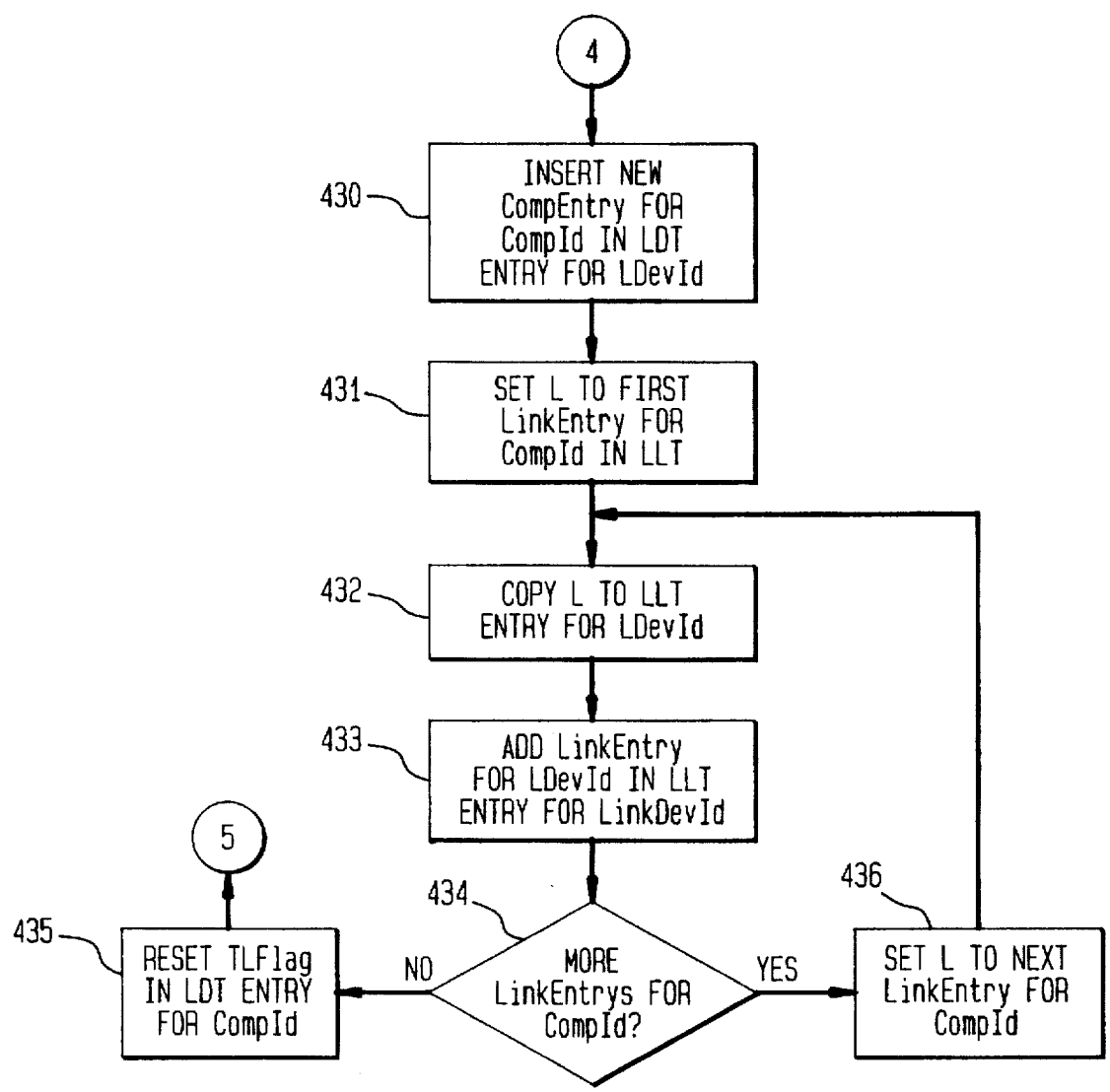

FIGS. 4C and 4D show the input and processing of the LCF 300. In step 420 the resource manager 626 opens the LCF 300. In step 422, it checks if end-of-file on the LCF 300 has been reached. If so, it proceeds to step 440. If not, in step 424 it reads the next LCF record. In step 426, it checks if an entry for the device specified by LDevId 330 already exists in the LDT 100. If not, in step 428, it creates new entries in the LDT 100 and the LLT 200. The DevId 102 and NodeId 210 are set to LDevId 330 and the DevType 104 is set to the LogDevType 332. The other fields are initialized as in step 406. The resource manager 626 then executes step 430.

In step 430 of FIG. 4D, the resource manager 626 locates the entry in the LDT 100 for the device specified by LDevId 330 and inserts a new CompEntry 109 with the CompId 110 set to SCompId 334. In step 431, it locates the entry in the LLT 200 for CompId 100 and sets a variable L to point to the first LinkEntry 220. In step 432, it makes a copy of L and inserts it into the connection list 218 for the device LDevId 330 in the LLT 200. In step 434, it locates the entry in the LLT 200 for the device specified by LinkDevId 230 and inserts a new LinkEntry 220 into the its connection list 218. The LinkDevId 230 of the new LinkEntry is set to LDevId 330. In step 434, it checks if there are more LinkEntrys 220 in the connection list 218 of CompId 100. If so, in step 436, L is set to the next LinkEntry 220 and the resource manager loops back to step 432. If not, the TLFlag 105 in the entry in the LDT 100 for CompId 110 is set to 0 and the resource manager 626 loops back to step 422.

Figure 4E:
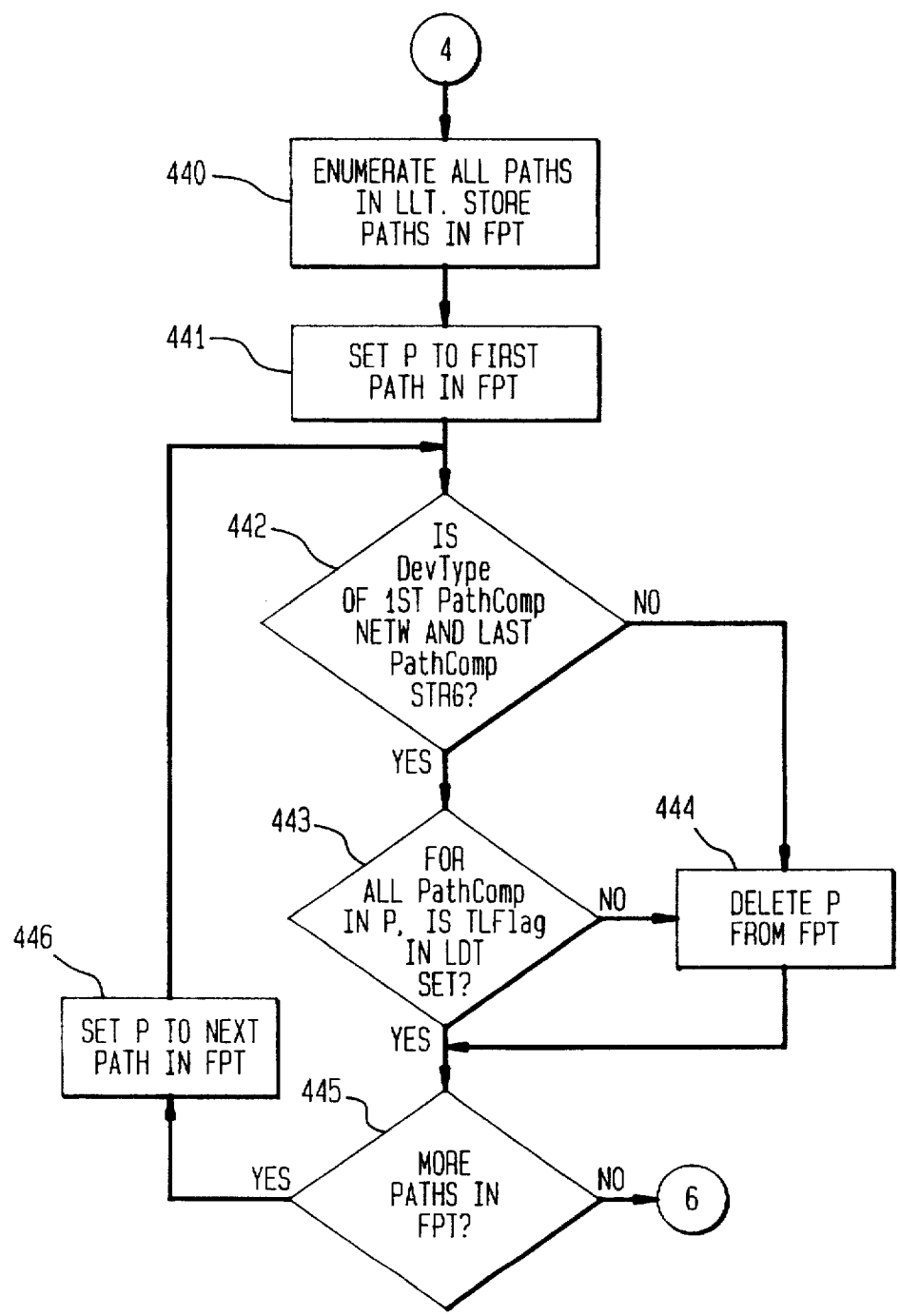
Figure 4F:
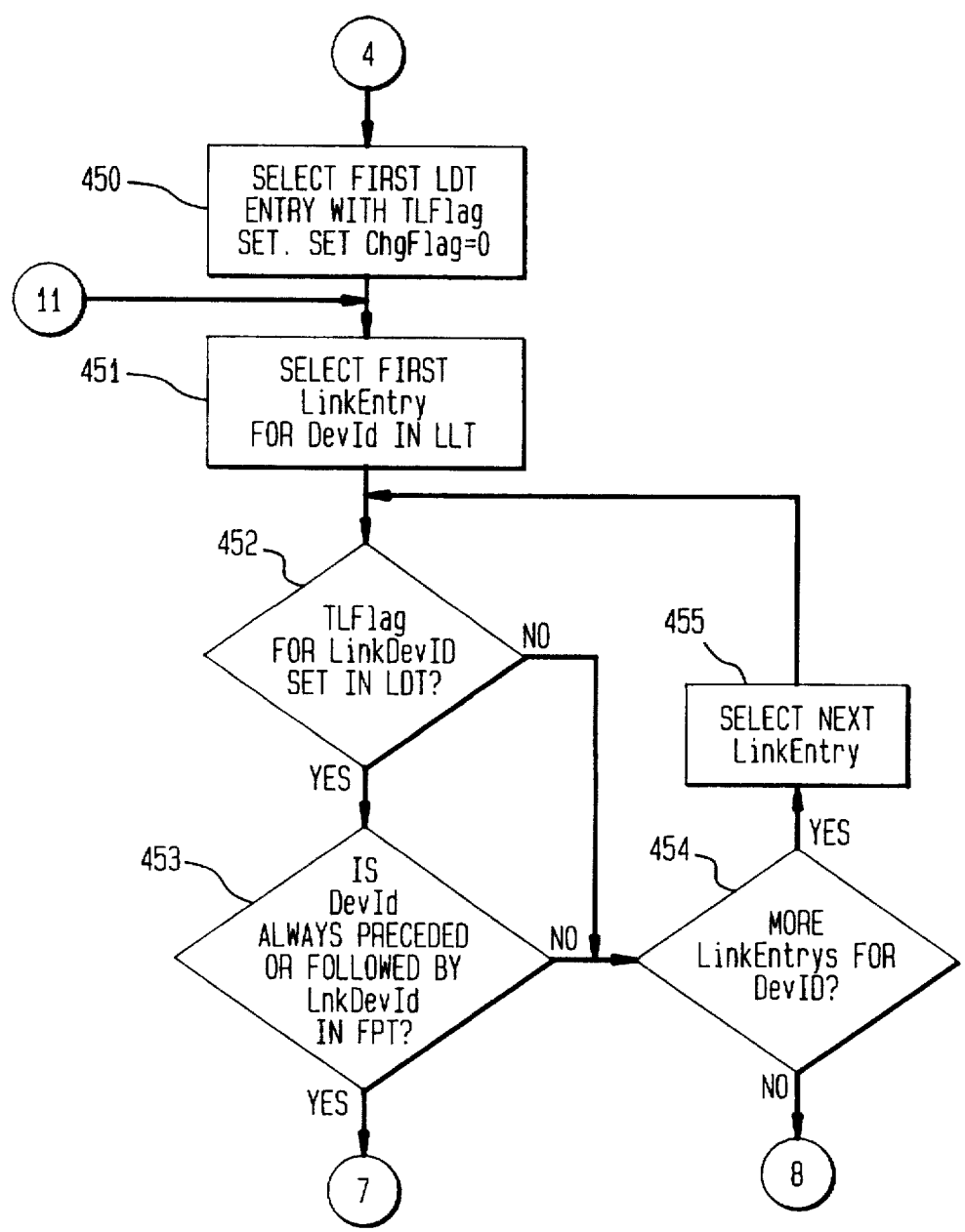
Figure 4G:
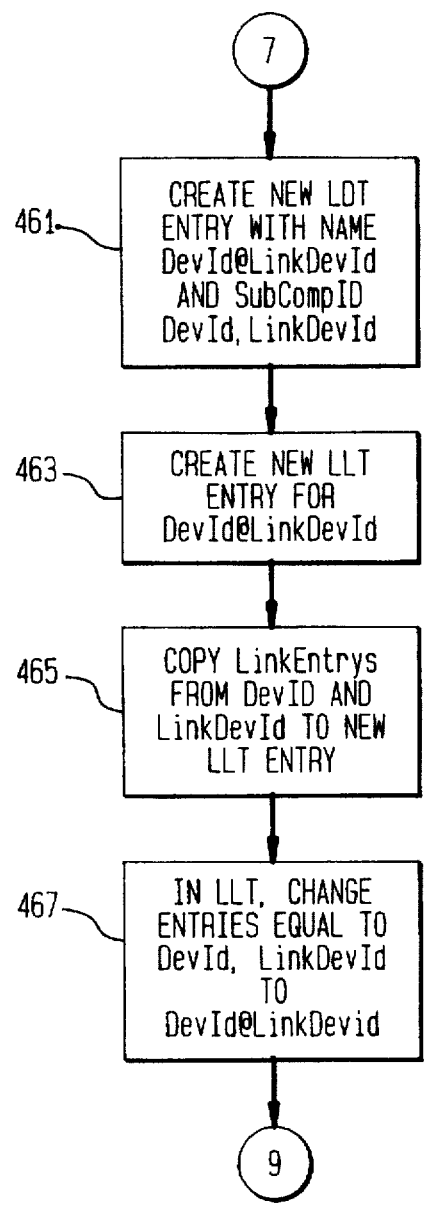

FIGS. 4E, 4F and 4G show the initial generation of the Path Table (FPT) 510. In step 440, the resource manager 626 enumerates all the paths in the LLT 200 by following all the connection lists 218 and stores the resulting paths in the FPT 510. In step 441, it locates the first path P in the FPT 510. In step 442, the resource manager 626 examines the entries in the LDT 100 for the devices specified by the first and last PathComp 518 in P. If the DevType 104 of the entries for the first and last PathComp 518 are not NETW and STRG respectively, this is not a data path from a video source to a network node. Hence, the resource manager 626 proceeds to step 444. If the test in step 442 is satisfied, the resource manager 626 checks the entries in the LDT 100 of all the PathComp 518 in P to verify that the TLFlag 105 field for all the entries is 1. If not, in step 444 the resource manager 626 deletes P from the PDT 510 and proceeds to step 445. If the test in step 443 is successful, the resource manager 626 executes step 445 where it checks if there are more paths in the FPT 510. If so, it locates the next path P in step 446 and proceeds to execute step 442. If not, it proceeds to step 450.

In step 450 of FIG. 4F, the resource manager 626 locates the first entry in the LDT 100 with TLFlag=1. It also sets a local flag ChgFlag to 0. Next, in step 451, it locates the first LinkEntry 220 in the LLT 200 for the device specified by D. In the following, the DevId 102 of the located entry in the LDT 100 is denoted by D and the LinkDevId 230 of the located LinkEntry 220 is denoted by L. In step 452, the resource manager locates the entry in the LDT 100 for the device specified by L and checks if its TLFlag is 1. If not, it executes step 454. Otherwise, in step 453, it checks all the paths in the FPT 510 to see if the devices specified by the D and L always occur consecutively. If not, in step 454, the resource manager 626 checks if there are more LinkEntrys for the device specified by D. If so, the resource manager 626 executes step 455 to locate the next LinkEntry and executes step 455. If not, the resource manager 626 executes step 474. If the test in step 453 succeeds, the resource manager 626 executes step 461.

In step 461 of FIG. 4F, the resource manager 626 creates a new logical device with subcomponents D and L by creating a new entry in the LDT 100. The device identifier 102 for the new entry is set to D@L where '@' is a special character that cannot otherwise occur in a device name. The subcomponent list of the entry for D@L in the LDT 100 is initialized to two entries, one for D and one for L. The other fields are initialized as in step 406. In step 463, the resource manager 626 creates a new entry in the LLT 200 for the new logical device. In step 465, the resource manager 626 copies the LinkEntrys 220 from the connection lists for D and L into the connection list 218 for D@L. Next, in step 467, the resource manager 626 scans the LinkEntrys 220 in the LLT 200 and changes any LinkEntry 220 with LinkDevId 230 equal to D or L to D@L. The resource manager 626 then executes step 471.

Figure 4H:
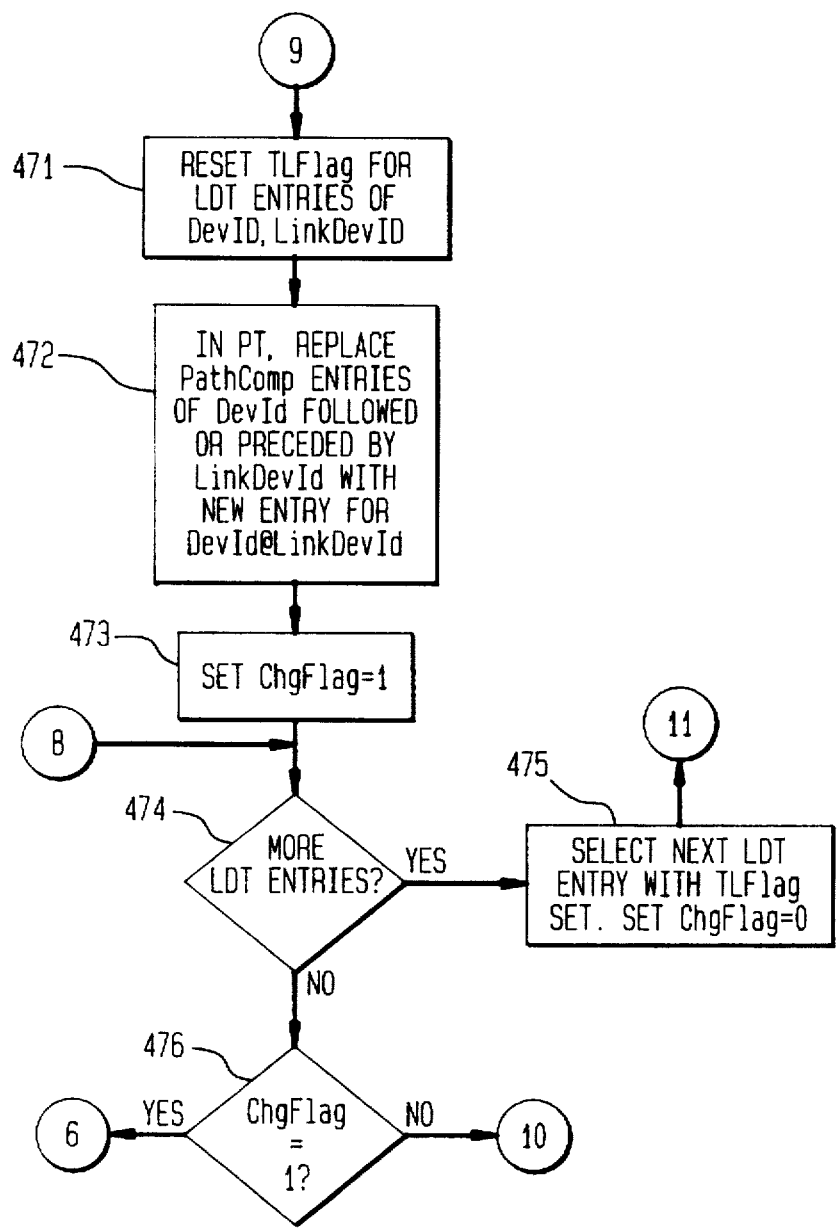

In step 471 of FIG. 4H, the resource manager 626 locates the entries in the LDT 100 for D and L and sets the TLFLag fields of those entries to 0. In step 472, the resource manager 626 scans the FPT 510 and replaces all entries with Path-Comp 518 equal to D and L in any path (which must occur consecutively) with a single entry with PathComp 518 set to D@L. It then sets ChgFlag to 1 in step 473. Next, in step 474, the resource manager 626 checks if there are additional entries in the LDT 100 with TLFlag=1. If so, it executes step 475 and locates the next entry in the LDT with TLFlag=1. It sets ChgFlag to 0 and executes step 451. Otherwise, it executes step 476 where it checks if ChgFlag is 1. If so, it executes step 450. If not, it executes step 480.

Figure 4I:
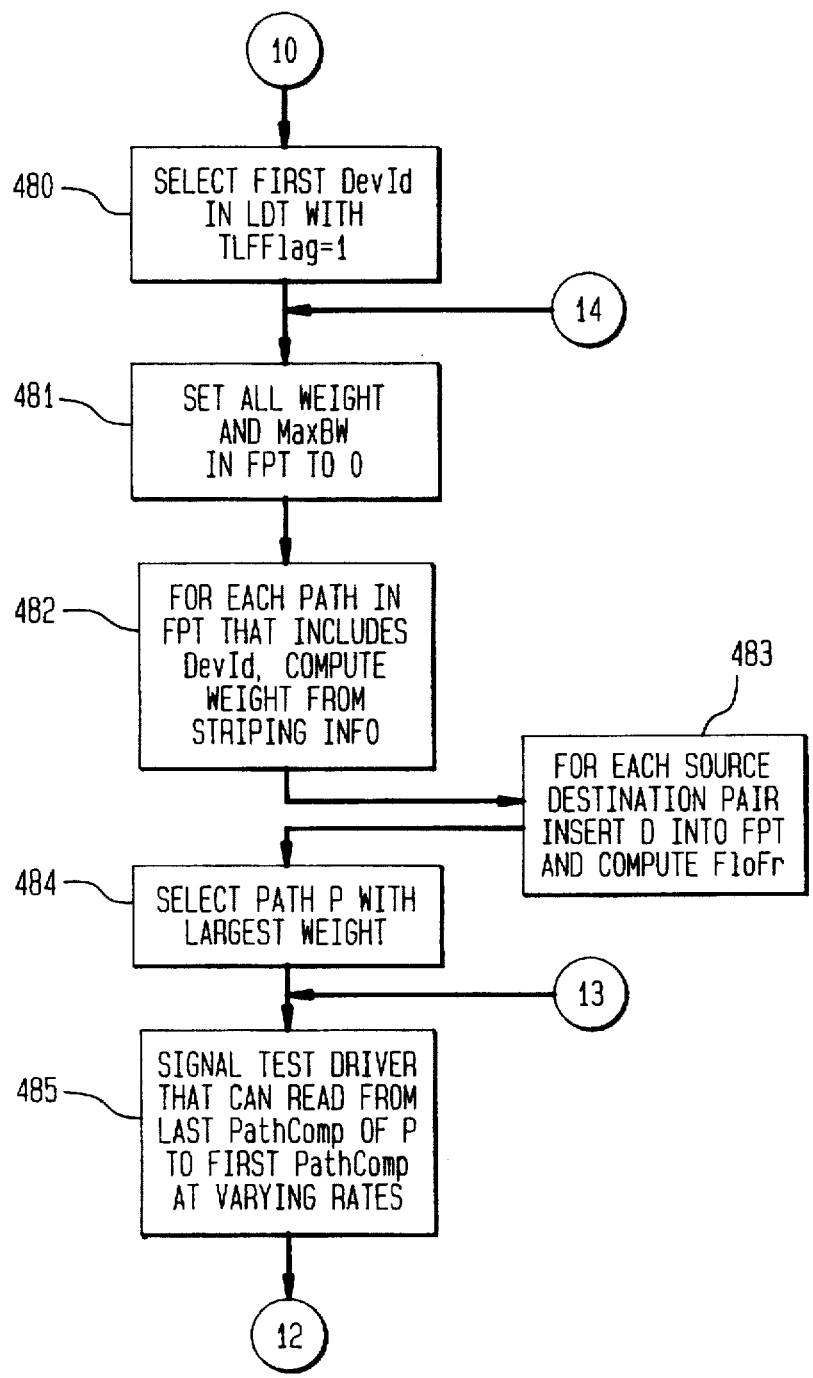
Figure 4J:
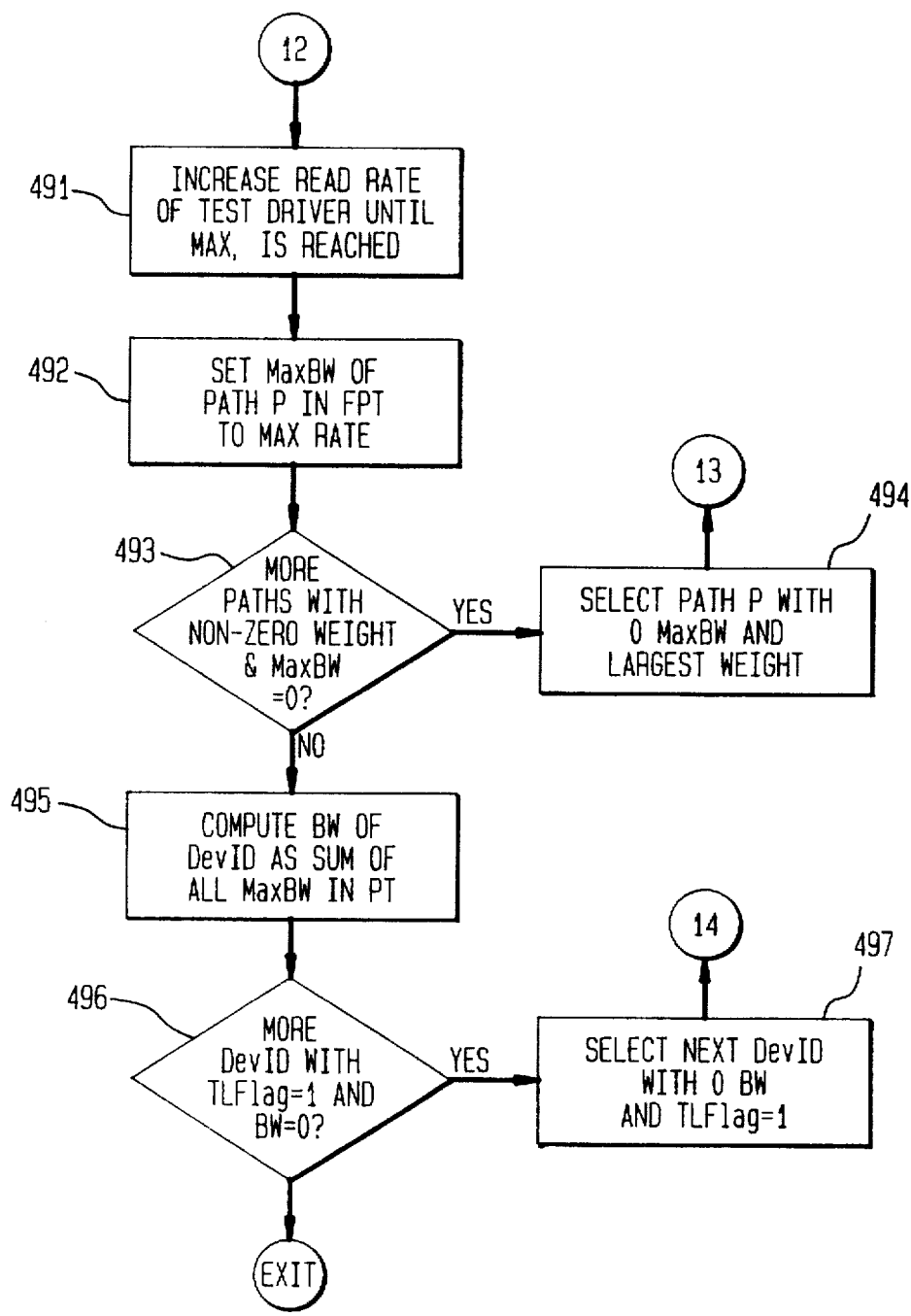

FIGS. 4I and 4J show how the resource manager 626 estimates the bandwidth of the devices in the video server. In step 480, the resource manager 626 locates the first device (with DevId 102 D) in the LDT 100 with TFlag=1. In step 481, the resource manager 626 sets the Weight 512 and MaxBW 513 fields of all paths to 0. In step 482, for each path in FPT 510 that includes the device D, the resource manager 626 uses the striping information from the LDT 100 to compute the fraction of the data flow over that flows through D. For example, if the last component in the path is a striping group consisting of 4 disks, and in the current path the data from two of the disks flows through D and the data from the other two disks flows over a parallel path, the flow fraction is 50%. The flow fraction for D for each path in the FPT 510 is stored in the Weight 512. In step 483, for each source destination pair in the FPT, the resource manager 626 looks up the PT 910 to find the corresponding entry. It then inserts a new entry for D in the source Path list 925 corresponding to this source destination pair and sets the FloFr 935 to be equal to the sum of all the Weight 512 entries in the FPT for all the paths with this source destination pair. In step 484, the resource manager 626 locates the path P in the PT with the largest FloFr 935. In step 484, the resource manager 626 sends a message to the test driver 632 that can read data at varying rates under the control of the resource manager from S to N.

In step 491 in FIG. 4J, the resource manager 626 increases the read rate of the test driver until the maximum data rate is reached due to the saturation of path P. In step 492, the MaxBW 513 for P is set to the maximum rate of M found in step 491. In step 493, the resource manager 626 checks if there are more paths through D by checking if there are more paths with non-zero Weight 512 and MaxBW 513. If there are, the resource manager executes step 494 and locates the path P with 0 maximum bandwidth and the largest weight. It then executes step 484. Otherwise, it computes the BW 106 of the device D in the LDT 100 as the sum of all the MaxBW 513 in the FPT 510. The resource manager 626 then checks in step 496 if there are more devices whose bandwidth needs to be estimated (i.e. devices with TLFlag 105 of 1 and BW 106 of 0). If there are such devices, in step 497 the resource manager 626 locates another such device D and proceeds to step 481. Otherwise, the resource manager 626 exits in step 498.

Figure 7:
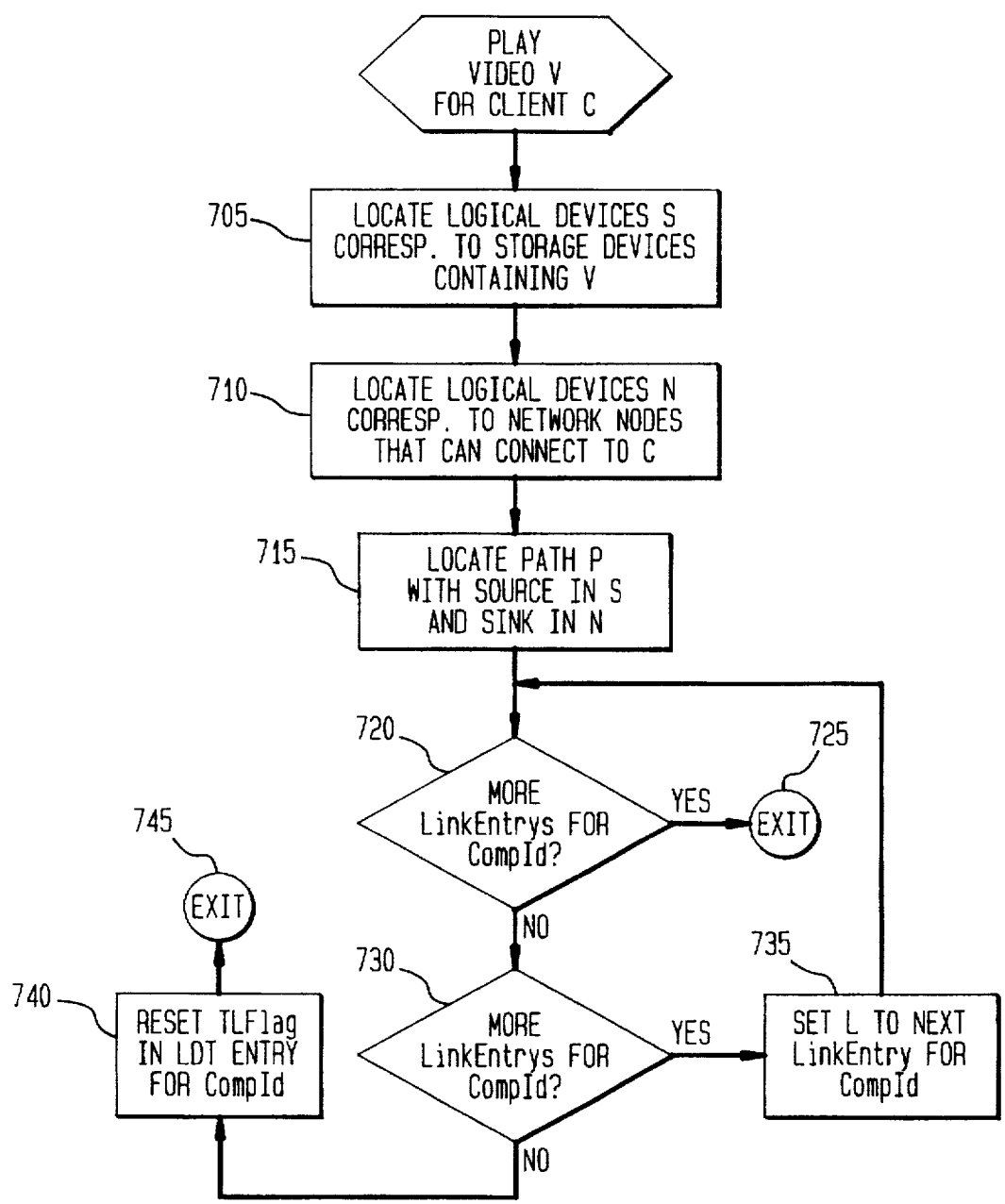
FIG. 7 shows the bandwidth reservation process according to an embodiment of the present invention; and, FIGS. 8A–8B show the failure recovery process according to an embodiment of the present invention.
Figure 8A:
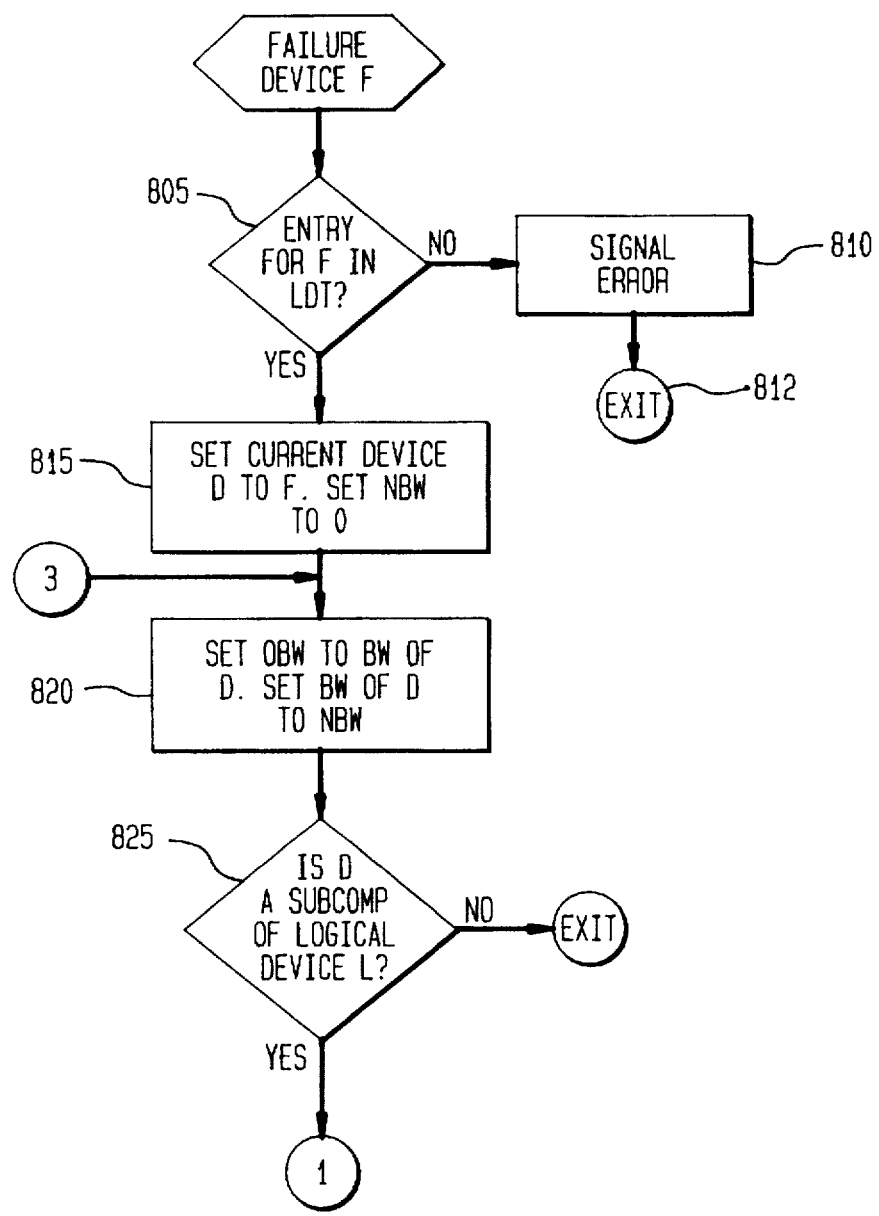
Figure 8B:
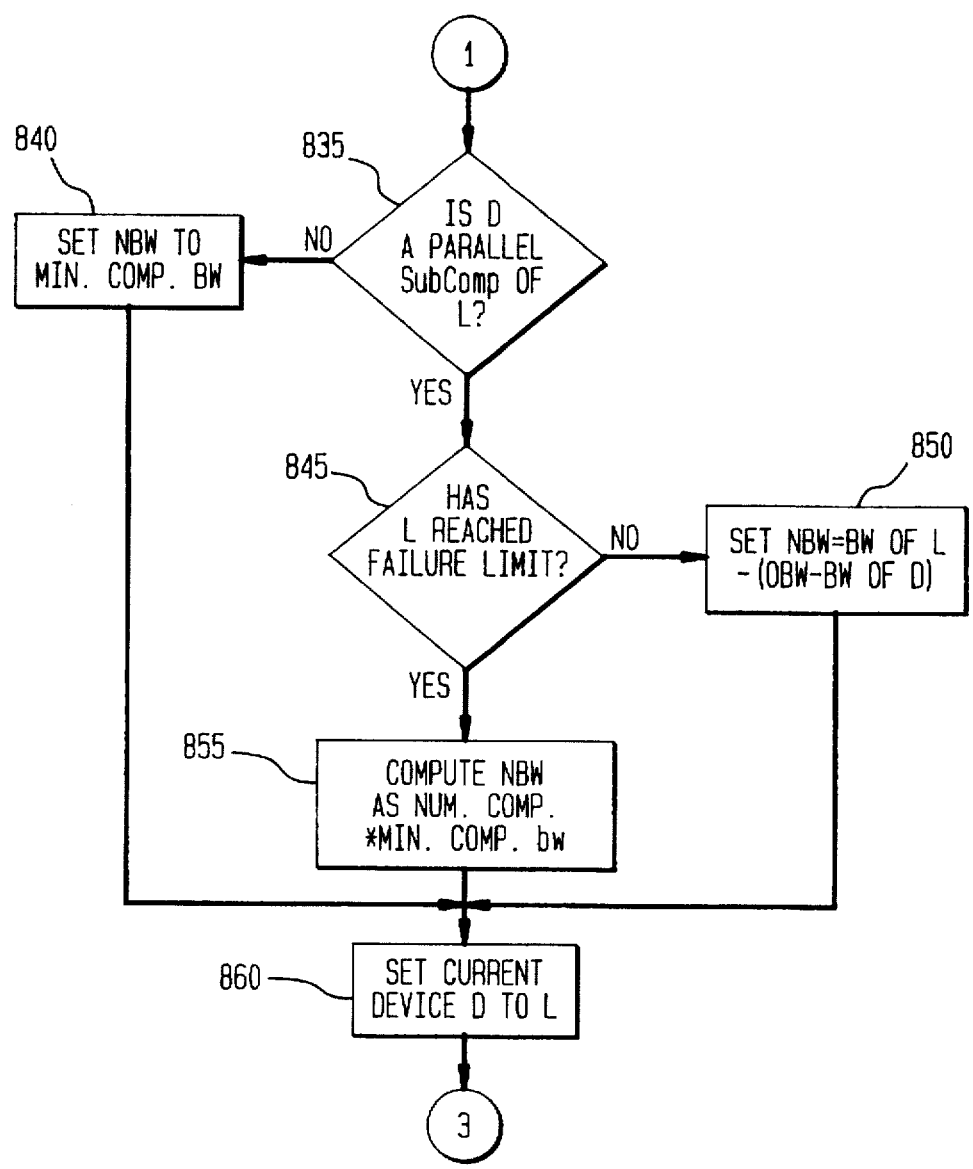

FIG. 7 shows the bandwidth reservation procedure when a request to play video V for client C is received. In step 705, the resource manager 626 locates the set of top-level logical devices S corresponding to the storage devices that have a copy of video V. This is done by first locating the storage devices that have a copy of video V, locating the entries for these devices in the LDT 100 and checking if these entries have the TLFlag 105 set (indicating they are not a subcomponent of any other logical device). The resource manager 626 then, for each logical device that does not have the TLFlag 105 set, locates the logical device that the current logical device is a subcomponent of together with the entry for the logical device in the LDT 100. The steps of checking the TLFlag 105 and locating the higher level logical device are then repeated for the new logical device. The set S consists of all those logical devices with the TLFlag 105 set. By a similar process, in step 710, the resource manager 626 finds the set N of all logical devices corresponding to the network adapters that can connect to C.

In step 715, the resource manager 626 scans the PT 910 to find a path P in which the source device is S and the end device is N. In step 720, the resource manager 626 examines the result of the scan. If the scan was unsuccessful, the resource manager 626 exits in step 725. Otherwise, in step 730, the resource manager 626 compares the BW 106 and Alloc 107 fields in the entry in the LDT 100 for all the PathComp 930 in P to see if sufficient bandwidth for playing the video is available. If sufficient bandwidth is not available for some PathComp 930, the resource manager 626 in step 735 continues the scan of the PT 910. Otherwise, in step 740, the resource manager 626 reserves bandwidth in all the PathComp 930 on the path P for the video V by incrementing the Alloc 107 field in the entry in the LDT 100 for the PathComp 930. The resource manager 626 then exits in step 745.

FIGS., 8A–8B illustrate the actions of the resource manager 626 during the failure of component F. In step 805, the resource manager 626 attempts to locate the entry for F in the LDT 100. If no such entry is found, the resource manager 626 exits with failure. Otherwise, in step 815 the resource manager 626 sets the variable D to F and NBW to 0. Next, in step 820 the resource manager 626 sets the variable OBW to NBW and sets the bandwidth of D to be NBW. Then in step 825, the resource manager 626 checks if D is a subcomponent of any device (denoted by L). If not, the resource manager 626 exits in step 830.

If the test in step 825 succeeds, in step 835 the resource manager 626 checks if D is a parallel subcomponent of L. If not, D is a serial subcomponent of L and the resource manager 626 in step 840 sets the bandwidth of L to be the minimum of all the subcomponents of all the subcomponents, and proceeds to step 860. If it is a parallel subcomponent, in step 845 the resource manager 626 checks if L has reached its failure limit. This can be done by scanning the subcomponent list SubComps 108, determining the number of failed devices and comparing this to the number of failures that can be tolerated (which depends upon the devType 104). If L has not reached its failure limit, the resource manager in step 850 sets NBW to the bandwidth of L minus the reduction in the bandwidth of D and proceeds to step 860. Otherwise, NBW is set to the number of subcomponents of L (determined by scanning the subcomponent list (SubComps 102) times the minimum bandwidth of all the subcomponents in step 855. In step 860 the resource manager 626 sets D to L in and then proceeds to step 820.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of determining load capacity of a system comprising the steps of:

identifying physical components of the system and their interconnection;

converting the physical components into logical components wherein at least one logical component is created by grouping a plurality of the physical components such that a load on the logical component will result in an approximately fixed proportional load on the plurality of physical components;

determining links between the logical components;

determining a proportion of the load placed on each link between a source and destination pair; and, storing a model the logical components and interconnection of the logical components in an electronically accessible data structure formed in a memory.

2. The method of claim 1 comprising the further step of using the model to generate measurement processes which can be used to determine the load capacity of at least one logical component.

3. The method of claim 1 wherein the grouping comprising the step of modeling multiple storage devices in a storage striping group as a single logical component.

4. The method of claim 1 wherein the grouping comprises the step of modeling subsets of serially interconnected physical components of a type wherein an identical load will always pass through all physical components in a subset as logical components.

5. The method of claim 1 wherein the grouping further comprises the step of modeling subsets of serially interconnected logical components of a type wherein an identical load will always pass through all logical components in a subset as a single logical component.

6. The method of claim 2 wherein the measurement processes comprises:

identifying destination logical components of the system wherein the load on a given source logical component can be altered by varying external stimuli on the destination logical components;

applying the external stimuli so as to saturate a given logical component;

recording a level of the stimuli at which the given logical component was saturated;

in turn, repeating the applying and recording for other logical components in the system.

7. The method of claim 1 comprising the further steps of detecting a failure of a physical component and responsive to the detection, altering the model to reflect any change in capacity of the corresponding logical component.

* * * * *